United States Patent
Benjamin

[11] Patent Number: 5,816,752
[45] Date of Patent: Oct. 6, 1998

[54] KNOCK OUT DEVICE

[76] Inventor: Darin L. Benjamin, 443 W. Thurston St., Elmira, N.Y. 14901

[21] Appl. No.: 792,454

[22] Filed: Jan. 31, 1997

Related U.S. Application Data

[60] Provisional application No. 60/019,755 Sep. 9, 1996.

[51] Int. Cl.$^6$ ...................................................... B23B 51/04
[52] U.S. Cl. ............................................. 408/68; 408/204
[58] Field of Search .............................. 408/68, 204, 207, 408/209, 14; 144/20, 23

[56] References Cited

U.S. PATENT DOCUMENTS

| | | |
|---|---|---|
| 58,924 | 10/1866 | Webster . |
| 1,234,467 | 7/1917 | Hamilton .................................. 408/68 |
| 2,184,919 | 12/1939 | Miller ...................................... 408/204 |
| 3,265,104 | 8/1966 | Gallo, Sr. .................................. 408/68 |
| 3,390,596 | 7/1968 | Trevathan .................................. 408/68 |
| 4,193,721 | 3/1980 | Hougen . |
| 4,295,763 | 10/1981 | Cunniff . |
| 4,652,185 | 3/1987 | Malrick ..................................... 408/68 |
| 5,076,741 | 12/1991 | Littlehorn . |
| 5,108,235 | 4/1992 | Czyzewski . |
| 5,171,111 | 12/1992 | Kishimoto . |
| 5,352,071 | 10/1994 | Cochran et al. . |

FOREIGN PATENT DOCUMENTS

| | | | |
|---|---|---|---|
| 234301 | 6/1961 | Australia ................................ 408/204 |
| 904860 | 11/1945 | France ...................................... 408/68 |
| 3532157 | 3/1987 | Germany ................................ 408/204 |
| 1465325 | 3/1989 | U.S.S.R. ................................. 408/204 |

*Primary Examiner*—Daniel W. Howell
*Attorney, Agent, or Firm*—Richard C. Litman

[57] ABSTRACT

A slug removal system for a hole saw including a spring and a knock-out device are disclosed. The knock-out device has a bore longitudinally through its center to allow a drill bit, which acts as a guide for the hole saw, to pass therethrough. The knock-out device also has holes for two set screws, which secure the device to the hole saw. The knock-out device is tapered to avoid the blades of the saw, and is movably attached to the hole saw by the set screws. As the hole saw is used, the slug pushes the knock-out device back and compresses the spring, which is seated at the back of the hole saw. When the sawing is finished, the spring pushes the knock-out device forward, forcing the slug out of the hole saw.

2 Claims, 3 Drawing Sheets

KNOCK OUT DEVICE

CROSS REFERENCE TO RELATED APPLICATIONS

This application claims the benefit of U.S. Provisional patent application Ser. No. 60/019,755 filed Sep. 9, 1996.

BACKGROUND OF THE INVENTION

1. Field of the Invention

The present invention relates to slug removal systems and more particularly to slug removal systems designed for use with a hole saw. Even more specifically, the present invention relates to a knock out device for use with a hole saw to eject a slug from the hole saw following its creation.

2. Description of the Prior Art

Hole saws are well known in the art for cutting holes of varying diameters into a material. Hole saws typically include a mandrel, the saw, a clutch, and a pilot drill. The drill is disposed coaxially within a bore contained in the mandrel and held in place by a set screw. The saw is often in the form of a section of tubing having saw teeth at one end and a cap at the other. The cap contains a threaded hole at its center so that the saw can be threaded onto the mandrel until it reaches a shoulder stop. The clutch is a collar which fits around and slides axially on a cylindrical surface on the mandrel and is kept from rotating on the mandrel by means of a key and keyway. Pins extending from one face of the collar engage holes in the cap of the saw when the collar is moved toward the cap, and disengage from the holes when the collar is moved away from the cap. When the pins engage the holes, torque is transmitted to the saw from the mandrel via the key and keyway and the pins. When the collar is moved away from the cap, the pins are disengaged and the saw can be threaded off the mandrel.

During operation, the pilot drill extends beyond the saw and enters the workpiece at the center of a hole to be cut by the saw. Whew the saw teeth cut the hole, a cylindrical piece of material called a slug, remains in the saw when it is removed from the workpiece. The slug must subsequently be removed, a task which can often be difficult. In fact, it often requires more time and effort to remove the slug than it does to create the hole, thereby degrading the cost effectiveness and convenience associated with using a hole saw.

In attempts to overcome such inconveniences, the prior art has introduced numerous devices for increasing the cost effectiveness of hole saws. For example, U.S. Pat. No. 58,924 issued on Oct. 16, 1866 to Webster discloses an apparatus constituting an improvement in tube-sheet cutters. The apparatus consists of an arrangement of a circular cutter and spring center, by which the circular head which forms the cutter is fitted to the tool stock with a lantern-joint. The spring center works within the stock and is retained by a key working in a slot.

U.S. Pat. No. 4,193,721 issued on Mar. 18, 1980 to Hougen discloses an arbor for annular hole cutters. The apparatus includes a resiliently compressible sleeve which is connected to a central pilot pin in the cutter. The sleeve is expanded radially into tight frictional contact with the bore of the arbor so that a compression spring expands slowly by means of the frictional contact. The compression spring biases a pointed pilot pin axially outwardly at the center of the cutter and compresses progressively as the cutter penetrates into the work. As the spring expands, it slows the recovery rate of the compressible sleeve when the cutter penetrates through the surface of the workpiece.

U.S. Pat. No. 4,295,763 issued on Oct. 20, 1981 to Cunniff discloses a plug cutter for use in making plugs of wood. The cutter is adapted to be held in a chuck for rotation about a central axis. A pilot, having a centering tit for locating the wooden plug as it is being cut, is spring biased in the holder. Four steel cutters, two of which are oriented at a slightly different angle, are provided in a circumaxially spaced relationship around the axis such that the plug can be cut with two distinct tapers. Each cutter is adjustable in the holder and held in place by a screw with a number of shims provided to cut plugs of different sizes.

U.S. Pat. No. 5,076,741 issued on Dec. 31, 1991 to Littlehorn discloses a plug ejecting hole saw which facilitates removal of the plug produced each time a hole is cut by the saw. The saw includes a threaded portion on the mandrel which is approximately equal to the length of the saw cylinder. The threaded portion allows the clutch to be moved well away from the saw after a hole is cut. The saw is held from rotating and the mandrel is threaded further into it so that its ends eject the plug.

U.S. Pat. No. 5,108,235 issued on Apr. 28, 1992 to Czyzewski discloses a hole saw arbor assembly which is connectable to a source of torque. A power tool mount is disposed on the first end of the arbor, and threads are disposed on the second end of a construction capable of mounting a hole saw thereon. A collar retraction area is disposed on the first end of the arbor while a collar mount areas is disposed its second end. A drive collar having a central bore therein receives the arbor.

U.S. Pat. No. 5,171,111 issued on Dec. 15, 1992 to Kishimoto discloses a drilling tool having a holder unit adapted to be detachably mounted to a hand-held drive unit and a hole saw unit detachably mounted to the holder unit. The hole saw unit includes a cylindrical cutter and a center pin, while the holder unit includes a spring and a slider disposed so as to allow a reciprocating motion of the center pin. Thus the drilling tool is able to constantly form an appropriate hole having a round surface. Expandable components of the drilling tool are formed as a unit to allow for ready replacement.

U.S. Pat. No. 5,352,071 issued on Oct. 4, 1994 to Cochran et al. discloses a hole saw arbor with retaining mechanism. The arbor assembly includes a shaft, a hole saw attached to the shaft, a drive collar retained on the shaft for engaging the hole saw, and a spring retained on the shaft. The retaining collar assembly includes a retaining collar which is retained on the shaft and abuts the spring such that it urges the retaining collar towards the drive collar. An axial limiting area is disposed on the shaft space away from the collar with a retaining collar rotating area disposed therebetween. The retaining collar rotating area allows the collar to rotate about the shaft while the axial limiting area only allows axial movement and not radial movement.

None of the above inventions and patents, taken either singly or in combination, is seen to describe the instant invention as claimed.

SUMMARY OF THE INVENTION

Accordingly, it is a principal object of the invention to provide a device that easily and safely removes the slug from a hole saw.

It is another object of the invention to provide a device for use with a hole saw that can accommodate a guiding drill bit.

It is an object of the invention to provide improved elements and arrangements thereof in an apparatus for the purposes described which is inexpensive, dependable and fully effective in accomplishing its intended purposes.

In accordance with the objects of the invention, a slug removal system is provided for use with a hole saw. The slug removal system includes a spring and a knock-out device. The knock-out device is tapered in order to avoid the blades of the saw and contains a bore which extends longitudinally through its center. The bore allows a drill bit to pass through the knock-out device, and acts as a guide for the hole saw. The knock-out device also includes threaded apertures for receiving two set screws used to secure the device to the hole saw and prevent it from cutting into the workpiece. The knock-out device is movably attached to the hole saw by the set screws. As the hole saw is used, the slug pushes the knock-out device back and compresses the spring, which is seated at the back of the hole saw. When sawing is finished, the spring, which has a great amount of potential energy, pushes the knock-out device forward, forcing the slug out of the hole saw.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1A:
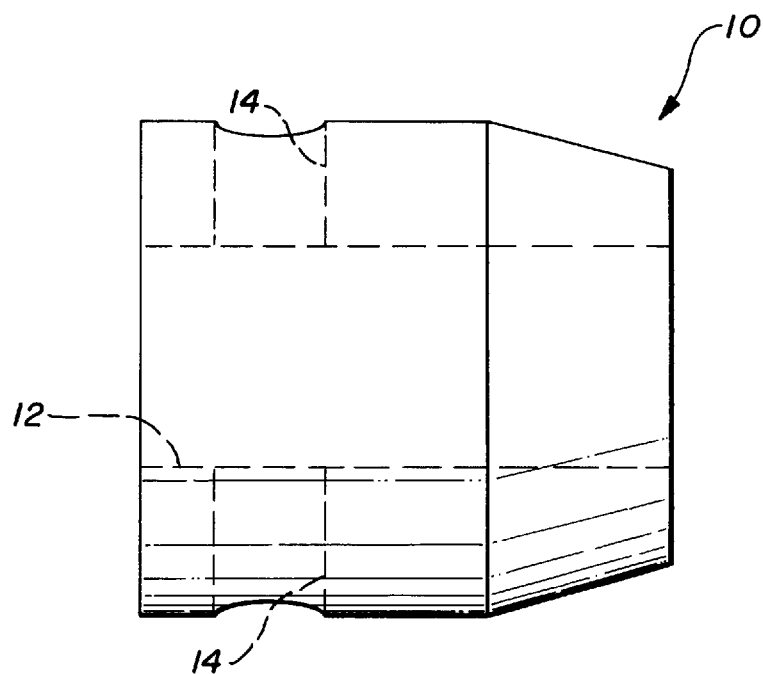
FIG. 1A is a front elevational view of the knock-out device.
Figure 1B:
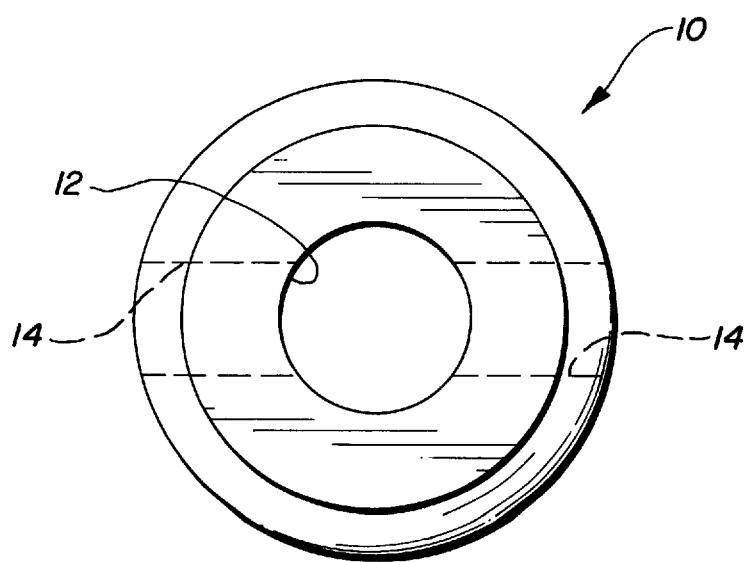
FIG. 1B is a top plan view of the knock-out device.

With reference to the drawings and initially to FIGS. 1A and 1B, a knock-out device 10 is shown for use with a hole drilling system. The knock-out device 10 has a generally cylindrical shape and includes a taper at one of its ends. The taper allows the knock-out device 10 to avoid the blades of the hole saw. The knock-out device 10 contains a bore 12 disposed axially and longitudinally therethrough. The bore 12 serves to receive a drill bit 30, which may be seen with additional reference to FIG. 2. A pair of set screw openings 14 containing threads disposed interiorly therein are also provided in the knock-out device 10. The set screw openings 14 are disposed in a radial direction such that they are in perpendicular alignment with the bore 12.

Figure 2:
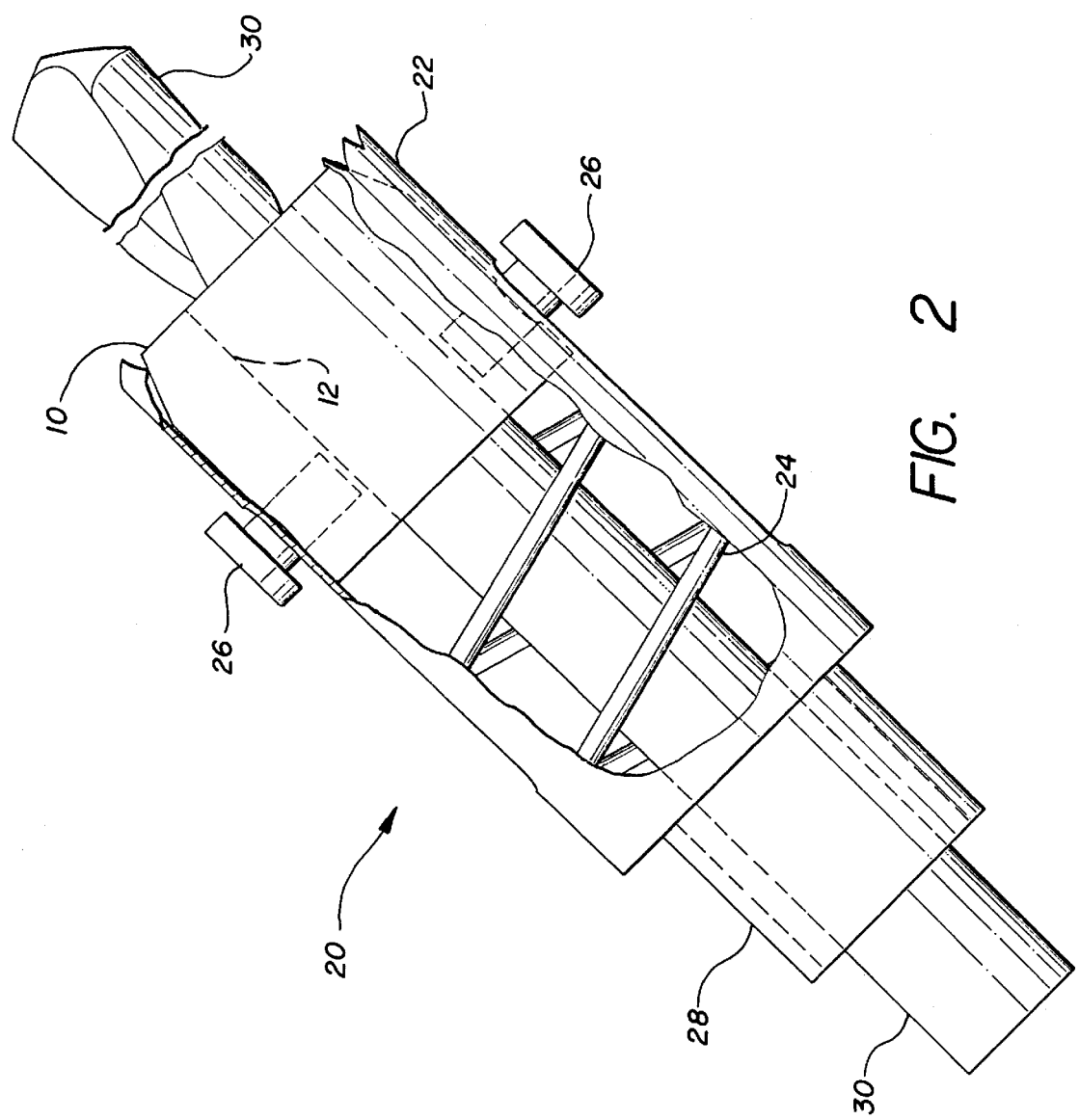
FIG. 2 is an environmental cut-away front elevational view of a hole drilling system.
Figure 3:
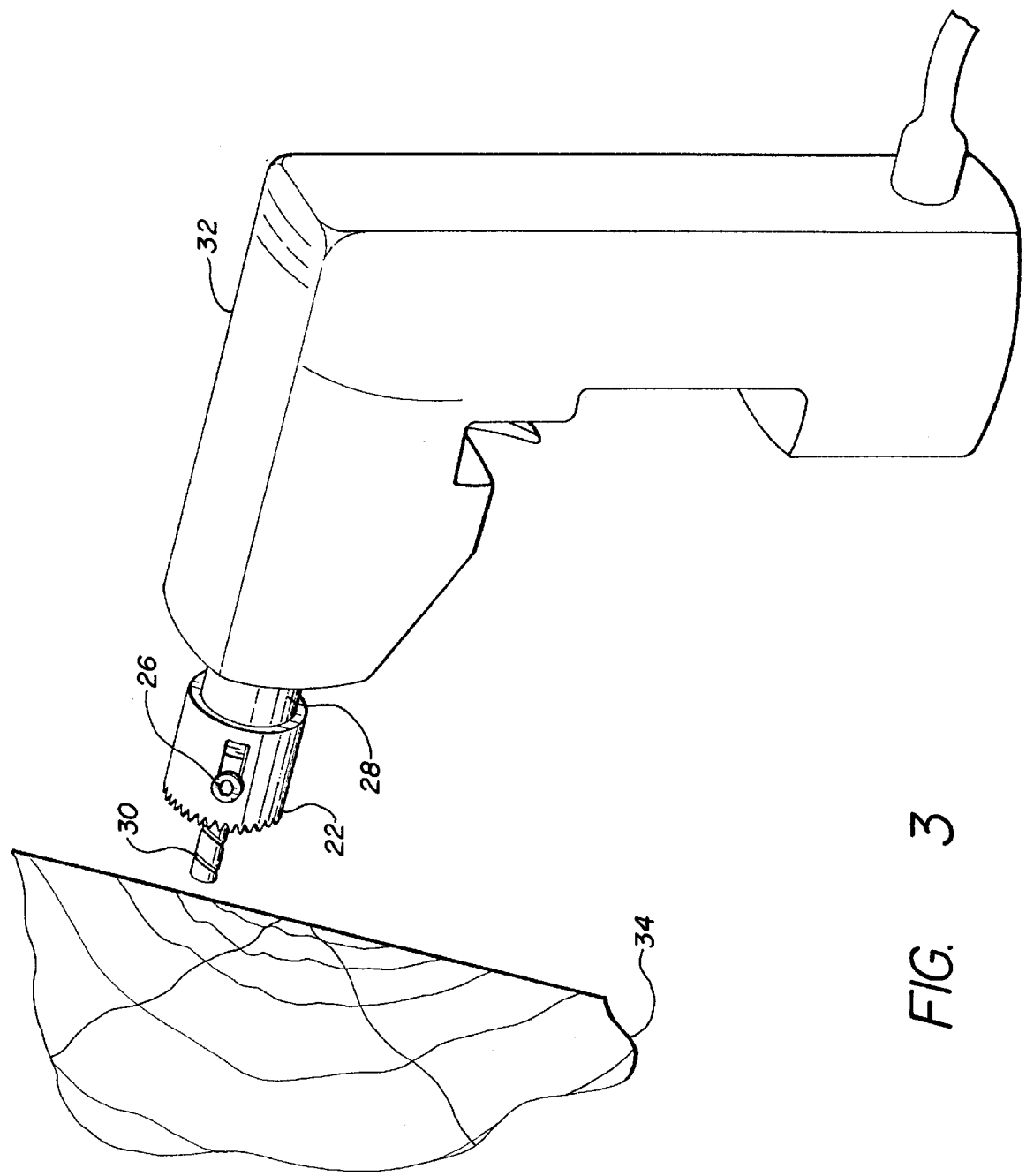
FIG. 3 is an environmental side elevational view of a hole drilling system.

Turning now to FIG. 2, a hole cutting system 20 is shown which incorporates the present knock-out device 10. The knock-out device 10 is secured into a hole saw 22 via a pair of set screws 26 which engage the threads contained in the set screw openings. Referring additionally to FIG. 3, it is seen that the set screws 26 are adjustable in a sliding manner along a pair of oval-shaped openings disposed along the side of the periphery of the hole saw 22. The set screws 26 function to stop the hole cutting system 20 at a predetermined distance so that it doesn't penetrate the workpiece. A spring 24 is seated inside and on the bottom of the hole saw 10. The hole drilling system 20 is held onto a drill 32 by an arbor 28. A guiding drill bit 30 may optionally be used with the hole drilling system 20. When used, the drill bit 30 allows for the alignment of the hole saw 22 before it begins drilling. The bore 12 guides the drill bit 30 and keeps it from bending and getting broken by the hole saw 22, while the knock out device 10 acts as a buffer between the hole saw 22 and the drill bit 30.

The functionality of the instant invention will be discussed with reference to FIGS. 2 and 3. As the hole saw 22 enters the material 34 to be cut and creates the circular hole, the slug being cut enters the hole saw 22 and becomes temporarily lodged therein. The slug pushes the knock-out device 10 into the hole saw 22 and exerts a force against the spring 24. The force compresses the spring 24 and increases the potential energy stored therein. When the hole is completely drilled and the hole saw is stopped by the set screws 26, the drill 32 and hole saw 22 are removed from the material. This action removes the force which was compressing the spring 24. Consequently, the spring 24 releases is potential energy by expanding to its natural state. Expansion of the spring 24 forces the knock-out device 10 forward within the hole saw 22, thereby pushing the slug outside of the hole saw 22.

It is to be understood that the present invention is not limited to the sole embodiment described above, but encompasses any and all embodiments within the scope of the following claims.

I claim:

1. In combination with a hole saw, a slug removal system comprising:

a cylindrical knock-out device which fits into said hole saw and has a tapered upper end, said knock-out device forming a bore running axially and longitudinally therethrough for receiving a drill bit and defining a pair of set screw openings running in a radial direction of the knock-out device;

a spring seated in said hole saw and behind a lower end of said knock-out device, said spring gaining potential energy as it is compressed by said knock-out device; and a pair of set screws slidably holding said knock-out device in said hole saw, and defining a predetermined depth which said hole saw may penetrate into a workpiece.

2. A hole-drilling system comprising:

a hole saw defining a pair of oval-shaped openings on opposite sides of its periphery;

a cylindrical knock-out device which fits into said hole saw and has a tapered upper end, said knock-out device including a bore running axially and longitudinally therethrough for receiving a drill bit and defining a pair of set screw openings running in a radial direction of the knock-out device;

a spring seated in said hole saw and behind a lower end of said knock-out device, said spring gaining potential energy as it is compressed by said knock-out device; and a pair of set screws slidably holding said knock-out device in said hole saw, and defining a predetermined depth which said hole saw may penetrate into a workpiece.

* * * * *